April 15, 1952      A. G. PETERSON      2,592,731
FRICTION SHOCK ABSORBING MECHANISM FOR RAILWAY CARS
Filed April 28, 1950
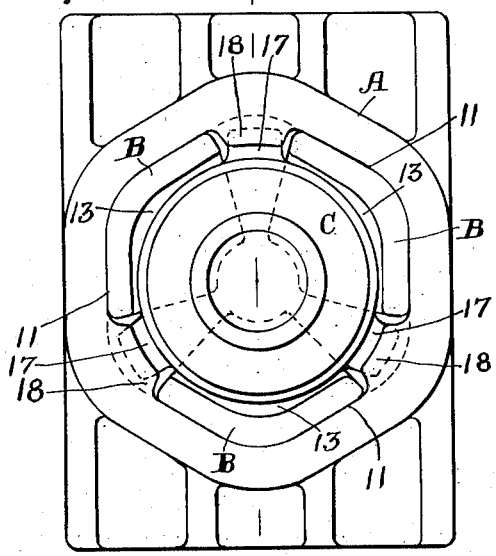
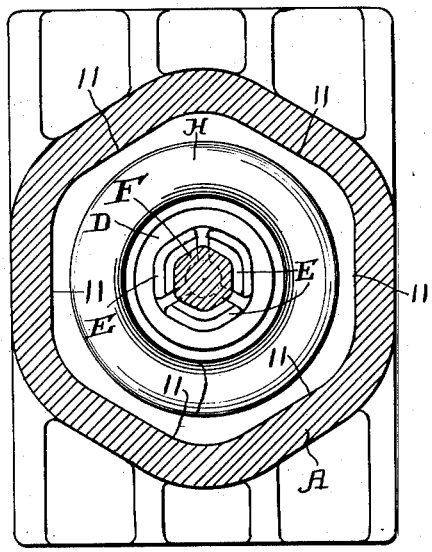
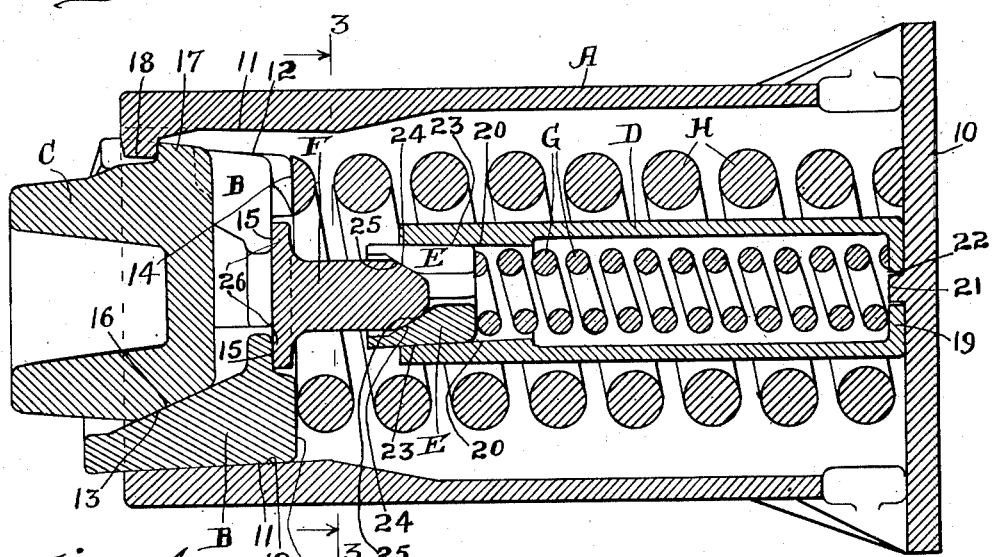
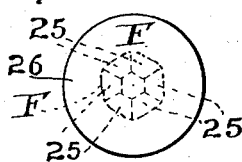
Inventor:
Arnold G. Peterson.

Patented Apr. 15, 1952

2,592,731

UNITED STATES PATENT OFFICE 2,592,731

FRICTION SHOCK ABSORBING MECHANISM FOR RAILWAY CARS

Arnold G. Peterson, Chicago, Ill., assignor to W. H. Miner, Inc., Chicago, Ill., a corporation of Delaware Application April 28, 1950, Serial No. 158,656

2 Claims. (Cl. 213—34)

This invention relates to improvements in friction shock absorbing mechanisms especially adapted for use in connection with draft riggings of railway cars.

One object of the invention is to provide a friction shock absorbing mechanism of the character indicated, having high capacity, and comprising an outer friction casing, friction shoes slidingly telescoped within said casing, a pressure transmitting wedge block in wedging engagement with the shoes, a second casing within the outer casing, friction shoes slidable within said second casing, a wedge in wedging engagement with said second named shoes and bearing on the inner ends of the first named shoes, a spring within the second named casing yieldingly opposing inward movement of the second named shoes, and a main spring within the first named casing, surrounding said second named casing, and yieldingly opposing inward movement of said first named shoes.

Other objects of the invention will more clearly appear from the description and claims hereinafter following.

In the accompanying drawing forming a part of this specification, Figure 1 is a front, elevational view of my improved friction shock absorbing mechanism. Figure 2 is a longitudinal sectional view, corresponding substantially to the line 2—2 of Figure 1. Figure 3 is a transverse, vertical sectional view, corresponding substantially to the line 3—3 of Figure 2. Figure 4 is an end elevational view of the wedge member of the inner friction shock absorbing mechanism, looking from left to right in Figure 2.

As shown in the drawing, my improved friction shock absorbing mechanism comprises broadly a main friction casing A, a set of three friction shoes B—B—B slidingly telescoped within the casing A, a wedge block C in wedging engagement with the shoes B—B—B, a second or inner friction casing D, a second set of three friction shoes E—E—E in sliding frictional engagement with the casing D, a second wedge block F abutting the inner ends of the shoes B—B—B and having wedging engagement with the shoes E—E—E, a spring G within the casing D, yieldingly opposing inward movement of the shoes E—E—E, and a main spring H within the casing A yieldingly opposing inward movement of the shoes B—B—B.

The casing A is in the form of a tubular member open at its front or left hand end, as seen in Figure 2, and closed at its rear end by a transverse wall 10, which is extended outwardly of the casing at opposite sides, as shown in the drawing, to provide a follower member, which is adapted to cooperate with the usual rear stops of the draft rigging of a railway car. The casing A is of hexagonal, transverse cross section, and has three inwardly converging, interior friction surfaces 11—11—11 of V-shaped, transverse cross section at its open end.

The friction shoes B are three in number and are slidingly telescoped within the casing A, each shoe having a V-shaped friction surface 12 on its outer side slidingly engaged with one of the friction surfaces 11 of the casing A. On the inner side, each shoe has a wedge face 13 of V-shaped, transverse cross section. The wedge faces 13—13—13 of the three shoes converge inwardly of the casing A. At its rear end, each shoe B presents a flat, transverse abutment face 14 for the spring H. The face 14 of each shoe is recessed at its inner side to provide a flat, transverse seat 15 on which the wedge block F is arranged to bear.

The wedge block C has three inwardly converging wedge faces 16—16—16 at its inner end of V-shaped, transverse cross section, engaged with the wedge faces 13—13—13 of the shoes B—B—B. The wedge C is further provided with three radial lugs 17—17—17, alternated with the wedge faces 16—16—16 thereof and extending between adjacent shoes B—B. The casing A is provided with three inwardly projecting stop lugs 18—18—18 at its open end in back of which the lugs 17—17—17 are engageable to limit outward movement of the wedge block C and hold the mechanism assembled.

The friction casing D is arranged within the casing A and has its rear end, which is closed by a transverse wall 19, bearing on the inner side of the wall 10 of the casing A. The casing D is also of hexagonal, transverse cross section and has three inwardly converging, interior friction surfaces 20—20—20 at its front end, which are of V-shaped, transverse cross section. The casing D is held centered by an inwardly projecting lug 21 on the wall 10 of the casing A, engaged in an opening 22 in the wall 19 of said casing D.

The friction shoes E are slidingly telescoped within the casing D, each shoe having a friction surface 23 on its outer side slidingly engaged with one of the friction surfaces 20 of the casing D. On its inner side, each shoe E has a wedge face 24 of V-shaped, transverse cross section. The wedge faces 24—24—24 of the three shoes E—E—E converge rearwardly or inwardly of the casing D.

The wedge block F is engaged between the shoes E—E—E and has three inwardly converging wedge faces 25—25—25 of V-shaped, transverse cross section engaged, respectively, with the wedge faces 24—24—24 of the three shoes E—E—E. At its front or left hand end, as viewed in Figure 2, the wedge block F has an annular flange 26 bearing on the seats 15—15—15 of the shoes B—B—B.

The spring G is in the form of a helical coil disposed within the casing D and bears at its front and rear ends, respctively, on the inner ends of the shoes E—E—E and the wall 19 of said casing.

The main spring H is also in the form of a helical coil and is heavier than the spring G. The spring H surrounds the casing D and has its front and rear ends bearing, respectively on the abutment faces 14—14—14 of the shoes B—B—B and the wall 10 of the casing A.

The operation of my improved friction shock absorber is as follows: Upon inward movement of the wedge C, during compression of the mechanism, the shoes B—B—B are wedged apart and forced to slide inwardly on the friction surfaces of the casing A, resisted by the spring H. During this inward movement of the wedge C, the shoes B—B—B force the wedge block F rearwardly or inwardly of the casing D, spreading the shoes E—E—E apart and sliding them inwardly on the friction surfaces 20—20—20 of the casing D, against the resistance of the spring G. As will be evident, exceptionally high frictional resistance is provided by my improved mechanism inasmuch as the frictional resistance provided by the shoes E—E—E sliding inwardly of the casing D, is added to the frictional resistance provided by sliding movement of the shoes B—B—B on the friction surfaces of the casing A.

I claim:

1. In a friction shock absorbing mechanism, the combination with a main friction casing having a closed rear end; of friction shoes slidingly telescoped within the other end of said casing; a wedge pressure transmitting member in wedging engagement with said shoes; and means yieldingly opposing inward movement of said shoes including a spring and a friction unit, said friction unit including a second friction casing within the first named casing, friction shoes slidingly telescoped within said second named casing, a spring within said second named casing yieldingly opposing inward movement of said second named shoes, said first named spring surrounding said second named casing, and said second named spring and friction unit being interposed between the closed rear end of said first named casing and said first named shoes.

2. In a friction shock absorbing mechanism, the combination with a friction casing; of friction shoes slidingly telescoped within the casing; a wedge pressure transmitting member in wedging engagement with said shoes; and means yieldingly opposing movement of said shoes inwardly of the casing, including a second friction casing, friction shoes slidable within said second named casing, a wedge in wedging engagement with said second named shoes and bearing on the inner ends of said first named shoes, a spring within said second named casing yieldingly opposing movement of said second named shoes inwardly of said second named casing, and a spring within said first named casing surrounding said second named casing and bearing on the inner ends of said first named shoes.

ARNOLD G. PETERSON.

REFERENCES CITED

The following references are of record in the file of this patent:

UNITED STATES PATENTS

| Number | Name | Date |
|---|---|---|
| 2,448,138 | Dath | Aug. 31, 1948 |
| 2,451,569 | Lounsbury | Oct. 19, 1948 |